(12) United States Patent
Lai et al.

(10) Patent No.: US 7,714,921 B2
(45) Date of Patent: May 11, 2010

(54) OPERATING METHOD OF IMAGE-SENSING UNIT AND IMAGE-SENSING DEVICE USING THE SAME

(75) Inventors: Cheng-Hsiao Lai, Taipei Hsien (TW); Ya-Chin King, Taipei Hsien (TW); Yueh-Ping Yu, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 909 days.

(21) Appl. No.: 11/160,034

(22) Filed: Jun. 6, 2005

(65) Prior Publication Data
US 2005/0274875 A1 Dec. 15, 2005

Related U.S. Application Data

(60) Provisional application No. 60/578,477, filed on Jun. 9, 2004.

(30) Foreign Application Priority Data
Sep. 7, 2004 (TW) ................ 93126970 A

(51) Int. Cl.
*H04N 5/335* (2006.01)
(52) U.S. Cl. ............ 348/308; 250/208.1; 257/292
(58) Field of Classification Search ............... None
See application file for complete search history.

(56) References Cited

U.S. PATENT DOCUMENTS 4,626,915 A * 12/1986 Takatsu ................ 348/299
6,140,630 A * 10/2000 Rhodes ................ 250/208.1
6,326,230 B1 * 12/2001 Pain et al. ................ 438/57
6,624,850 B1 * 9/2003 Guidash ................ 348/308
6,720,592 B1 * 4/2004 Kindt et al. ................ 257/231
7,223,954 B2 * 5/2007 McNulty ................ 250/208.1

FOREIGN PATENT DOCUMENTS

CN 1348181 5/2002

* cited by examiner

*Primary Examiner*—Sinh Tran
*Assistant Examiner*—Paul Berardesca
(74) *Attorney, Agent, or Firm*—Jianq Chyun IP Office

(57) ABSTRACT

The invention is directed to an operating method for an image-sensing unit and the image-sensing device using the same. The image-sensing unit comprises a photogate, a photodiode assembled with the photogate, and a first switch. One terminal of the first switch is coupled to a reference voltage, and the other terminal thereof is coupled to the photodiode. The operating method comprises: (a)Applying a first voltage to the photogate, (b)Turning on a first switch, (c)Turning off the first switch at a first time, (d)The photodiode being irradiated by a light, (e)Stopping applying a first voltage value to the photogate at a second time, (f)Applying a second voltage to the photogate at a third time, and (g)Maintaining the turn-off state of the first switch until a fourth time. The operating method for an image-sensing unit enables the image-sensing device using the same to enhance the dynamic range thereof.

18 Claims, 7 Drawing Sheets

OPERATING METHOD OF IMAGE-SENSING UNIT AND IMAGE-SENSING DEVICE USING THE SAME

CROSS-REFERENCE TO RELATED APPLICATION

This application claims the priority benefits of U.S. provisional application titled "A NEW WELL CAPACITY ADJUCTING SCHEME FOR HIGH SENSITIVITY, EXTENDED DYNAMIC RANGE CMOS IMAGING PIXEL SENSORS" filed on Jun. 9, 2004, Ser. No. 60/578,477. All disclosure of this application is incorporated herein by reference. This application also claims the priority benefit of Taiwan application serial no. 93126970, filed on Sep. 7, 2004. All disclosure of the Taiwan application is incorporated herein by reference.

BACKGROUND OF THE INVENTION

1. Field of Invention

The present invention relates to an operation of image-sensing unit and image-sensing device using the same. More particularly, the present invention relates to an operation of image-sensing unit and image-sensing device using the same capable of increasing the dynamic range of the image-sensing units.

2. Description of Related Art

There are more and more electronic products with built-in camera functions, such as mobile phones, personal digital assistants (PDAs) and toys. With the rapid development of electronic technology, the image sensors have gradually replacing the traditional films as major image sensing elements. The purpose of the image sensors is to convert light signals to electronic signals. A lot of the image sensors available in the market now use built-in photodiodes for acquiring light signals.

FIG. 1 shows a circuit diagram of a conventional image sensor. Please refer to FIG. 1. The image sensor 100 comprises a reference voltage Vcc, a photodiode 120, a first switch 130, a source follower 140, a second switch 180 and a memory circuit 160. The first switch 130, the source follower 140, and the second switch 180 can be transistors. The photodiode 120 and the source follower 140 are both electrically coupled to the first switch 130, and the diode 120 and the source follower 140 are both electrically coupled to the reference voltage Vcc. The first switch 130 is disposed between the diode 120 and the reference voltage Vcc. Besides, the gate of the source follower 140 is electrically coupled between the first switch 130 and the photodiode 120. The memory circuit 160 of the image sensor is used to record the variation of the output voltage Vout of the second switch 180, which is proportional to the voltage value of the gate of the source follower 140. The operation procedure of the image sensor 100 is discussed in detail below.

FIG. 2 schematically shows the variation of the output voltage of FIG. 1 in an operation cycle of an image sensor. Please refer to FIG. 1 and FIG. 2. As the operation cycle begins, the switch 130 is turned on. The voltage V1 of the photodiode 120 and the voltage value of the source follower 140 will be equal to the reference voltage Vcc. The switch 130 is then turned off at a first time T2, and the outer light 150 irradiates the photodiode 120 via lenses (not shown). Due to illumination of the light 150, the photo current is generated by the photodiode 120 and therefore the voltage V1 of the photodiode is lowered. Consequently, the voltage of the gate of source follower 140 reduces, too. Meanwhile, the output voltage Vout changes according to the voltage variation of the gate of source follower 140. Later, at the second time T2, again the first switch is turned on to start a new cycle. The output voltage of first time T1 and that of the second time T2 are recorded by the memory circuit 160, and by altering the difference in between, the image sensor can determine the intensity of outer light 150.

Please refer to FIG. 1 and FIG. 2. It can be found that, the more intense the outer light 150 is, the faster the output voltage Vout decreases. When the output voltage Vout drops to zero before the second time T2, the image sensor 100 is unable to determine the intensity of outer light 150. Therefore, there is a limit of the dynamic range for the image sensor 100 (Dynamic Range=the maximum intensity of light detectable by the image sensor/the minimum intensity of light detectable by the image sensor).

SUMMARY OF THE INVENTION

The present invention provides an operating method of image-sensing unit to increase the dynamic range and the sensitivity thereof.

The present invention also provides an image-sensing device to increase the dynamic range and sensitivity of the image-sensing units.

The present invention provides an operating method for image-sensing unit. The image-sensing unit comprises a photogate, a photodiode assembled with the photogate, and a first switch. One terminal of the first switch is connected to a reference voltage, and the other terminal to the photodiode. The operation method of the image-sensing unit comprises the following steps: (a)Applying a first voltage to the photogate, (b)Turning on a first switch, (c)Turning off the first switch at a first time, (d)The photodiode being irradiated by a light, (e)Lowering the voltage applied to the photogate at a second time, (f)Increasing the voltage applied on the photogate at a third time, and (g)Maintaining the turn-off state of the first switch until a fourth time.

The present invention also provides an image-sensing device, comprising an image-sensing unit and a control circuit. The image-sensing unit comprises a photogate, a photodiode, a first switch, a source follower, and a second switch. The photodiode and the photogate are assembled together. The first terminal of the first switch is connected to the reference voltage and the second terminal of the first switch is connected to one terminal of the photodiode. The first terminal of the source follower is connected to the reference voltage, and the control terminal of the source follower is connected to the other terminal of the photodiode. The first terminal of the second switch is connected to the second terminal of the source follower, and the second terminal of the second switch outputs one output voltage.

The control circuit of the image-sensing device is coupled to the image-sensing unit. The first voltage value is applied on the photogate by the control circuit and the first switch is turned on. Then the first switch is turned off at a first time. Then, the photodiode can be irradiated by light. Next, the first voltage applied on the photogate is stopped at a second time. Later, the second voltage is applied on the photogate at a third time. Also, the first switch maintains a turn-off state until a fourth time. Meanwhile, the second switch is turned on to output the output voltage.

To sum up, in the operating method of the image-sensing unit and image-sensing device using the same according to the present invention, because of the steps of stopping applying the first voltage on the photogate and applying the second voltage to the photogate at a third time, the capacity of the electric charge can be increased and the output voltage can be enhanced. Accordingly, the dynamic range of image-sensing unit can be increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
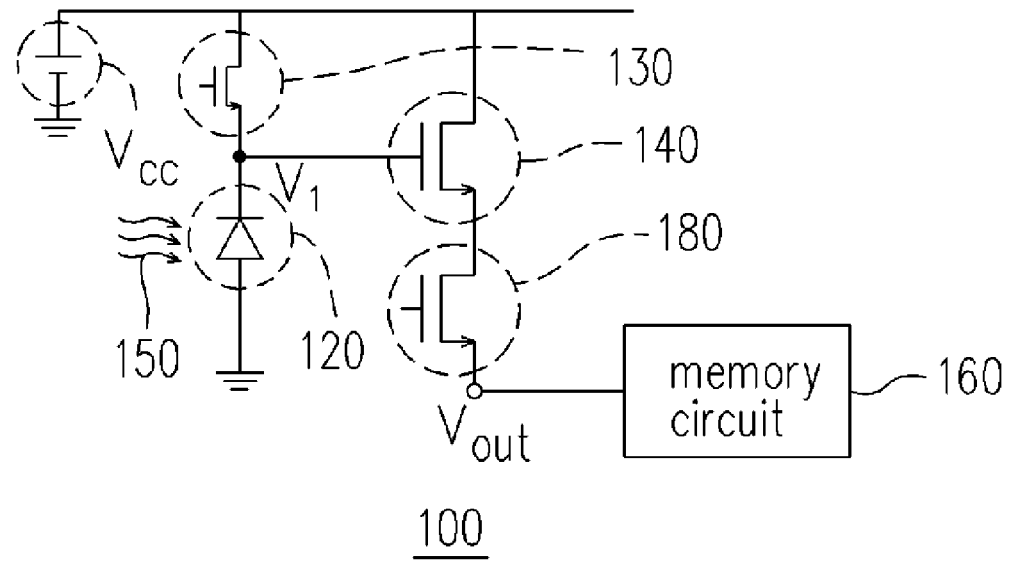
FIG. 1 schematically shows a circuit diagram of a conventional image sensor.
Figure 2:
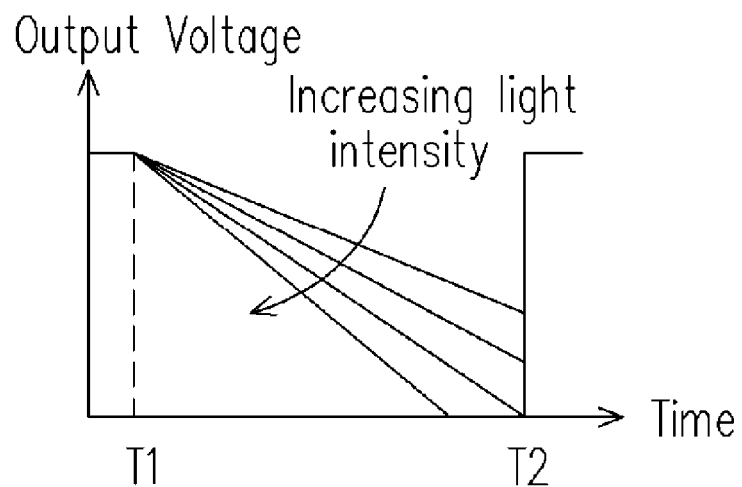
FIG. 2 schematically shows the variation of output voltage in an operation cycle of the image sensor.
Figure 3:
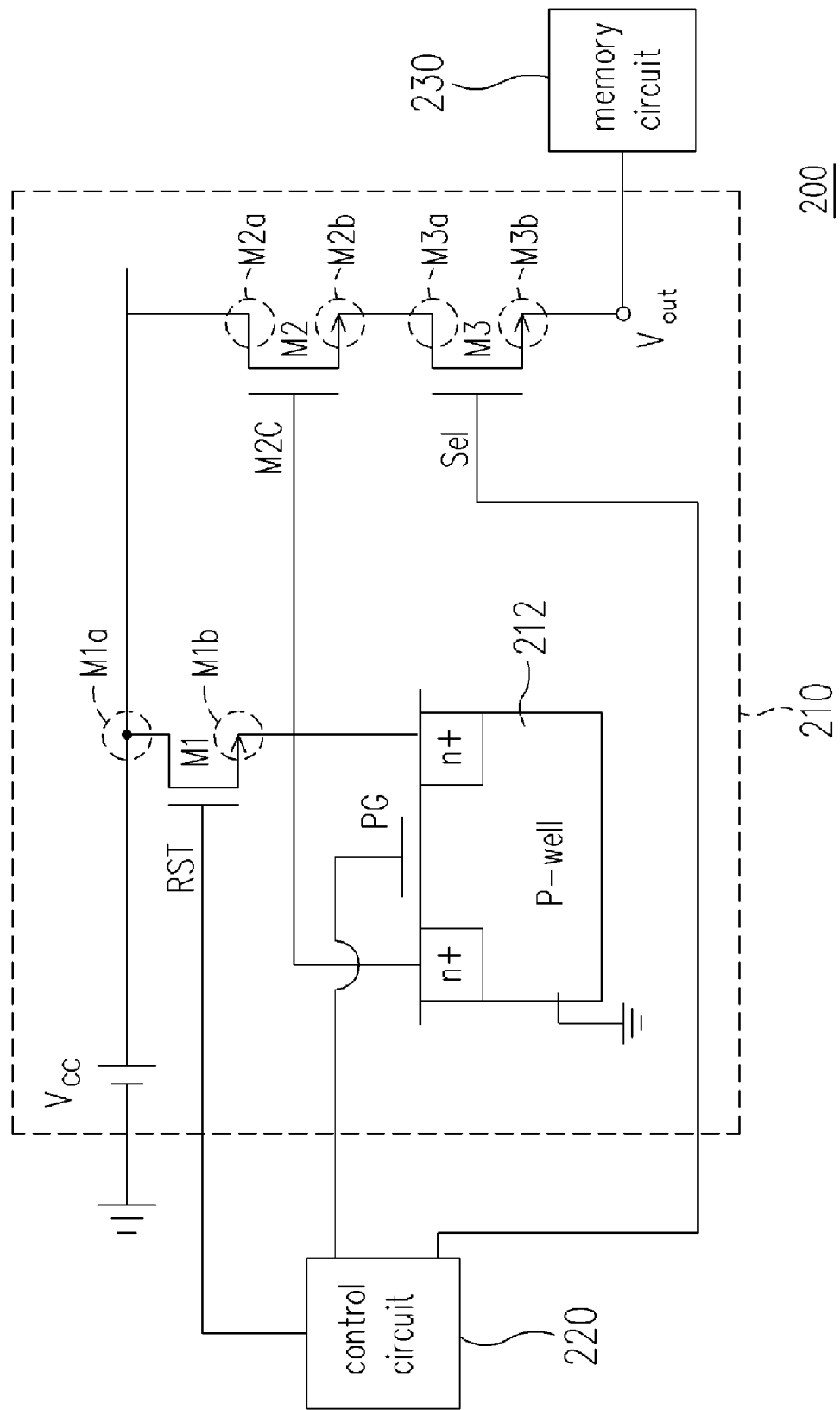
FIG. 3 schematically shows an image-sensing device according to one embodiment of the present invention.

FIG. 3 schematically shows an image-sensing device according to one embodiment of the present invention. Please refer to FIG. 3. The image-sensing device 200 comprises an image-sensing unit 210, a control circuit 220 and a memory circuit 230. The image-sensing unit 210 includes a photogate PG, a photodiode 212, a first switch M1, a source follower M2 and a second switch M3. The photodiode 212, for example, can be a metal-oxide-semiconductor, which is assembled with the photogate PG and thus two terminals of the photodiode 212 are located at the two sides of the photogate respectively. The first terminal M1a of the first switch M1 is connected to the reference voltage Vcc and the second terminal M1b of the first switch M1 is connected to one terminal of the photodiode 212. The first terminal M2a of the source follower M2 is connected to the reference voltage Vcc and the control terminal M2c of the source follower M2 is connected to the other terminal of the photodiode 212. The first terminal M3a of the second switch M3 is connected to the second terminal M2b of the source follower M2 and the second terminal M3b of the second switch M3 outputs an output voltage Vout. It should be noted that, the first switch M1, the source follower M2 and the second switch M3 can be transistors, for example.

Figure 4:
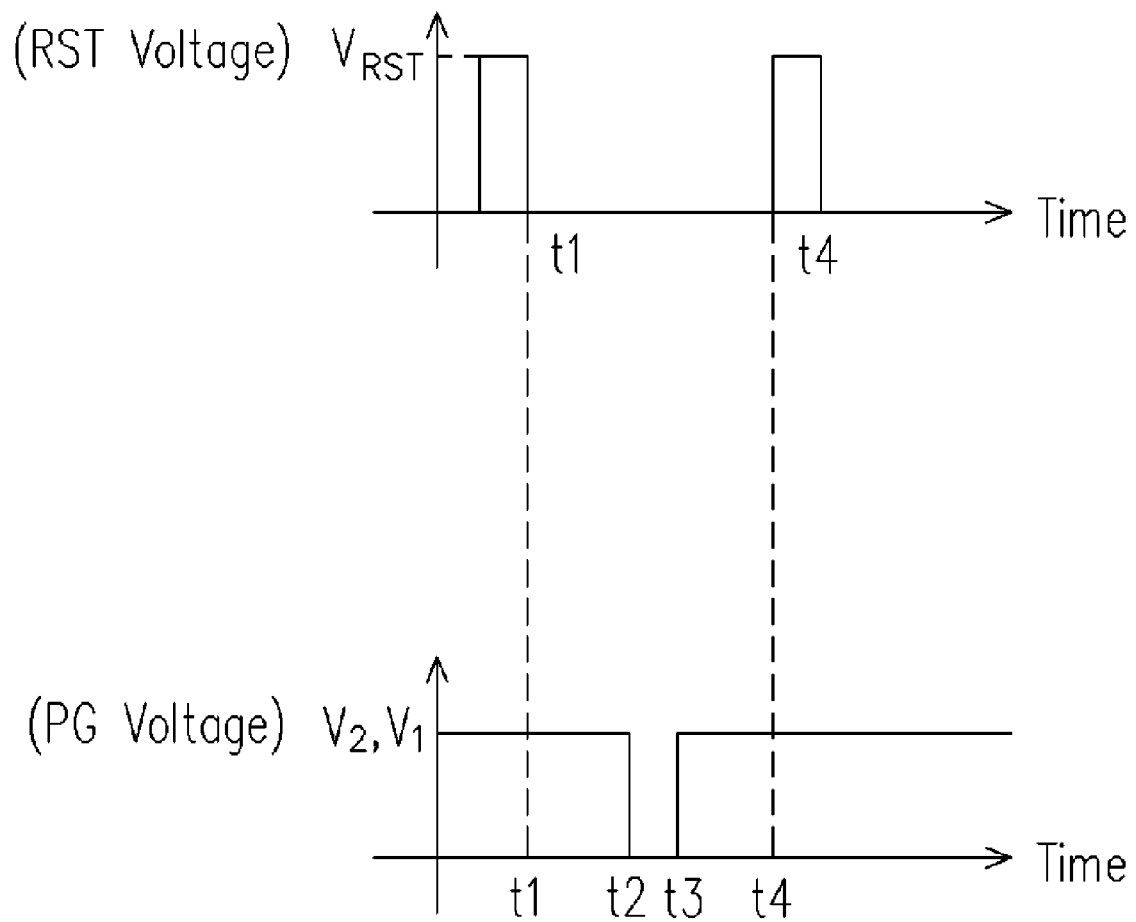
FIG. 4 is an illustration showing the relationship of the reset voltage RST versus time, and the relationship PG Voltage versus time.

FIG. 4 is an illustration showing the relationship of a reset voltage RST and time, and the relationship between the Voltage PG and time. Please refer to FIG. 3 and FIG. 4. The control circuit 220 of image-sensing device 200 is coupled to the image-sensing unit 210. The first voltage V1 is applied on the photogate PG by the control circuit 220. Next, the control circuit 220 applies the reset voltage VRST on the control terminal RST of the first switch M1 to turn on the first switch M1. And then applied VRST is stopped to turn off the first switch M1 at the first time t1. Meanwhile, the memory circuit 230 records the output voltage value Vout of the first time t1. Later, the outer light (not shown) starts to irradiate the photodiode 212 and accordingly the output voltage value Vout begins to decrease. The control circuit 220 stops applying the first voltage V1 to the photogate PG at the second time t2, and later the control circuit 220 applies the second voltage V2 on the photogate PG at the third time t3. Basically, the second voltage V2 is equal to the first voltage V1, but the first voltage V1 and the second voltage V2 can be equal to Vcc or not. The control circuit maintains the turn-off state of the first switch M1 until a fourth time t4, and meanwhile the control circuit 220 turns on the second switch M3 to output the output voltage Vout while the memory circuit 230 records the output voltage Vout of the fourth time t4. By using the difference between the output voltage Vout of t1 and that of t4 recorded in the memory circuit 230, the image-sensing device can determine the intensity of the outer light.

Figure 5:
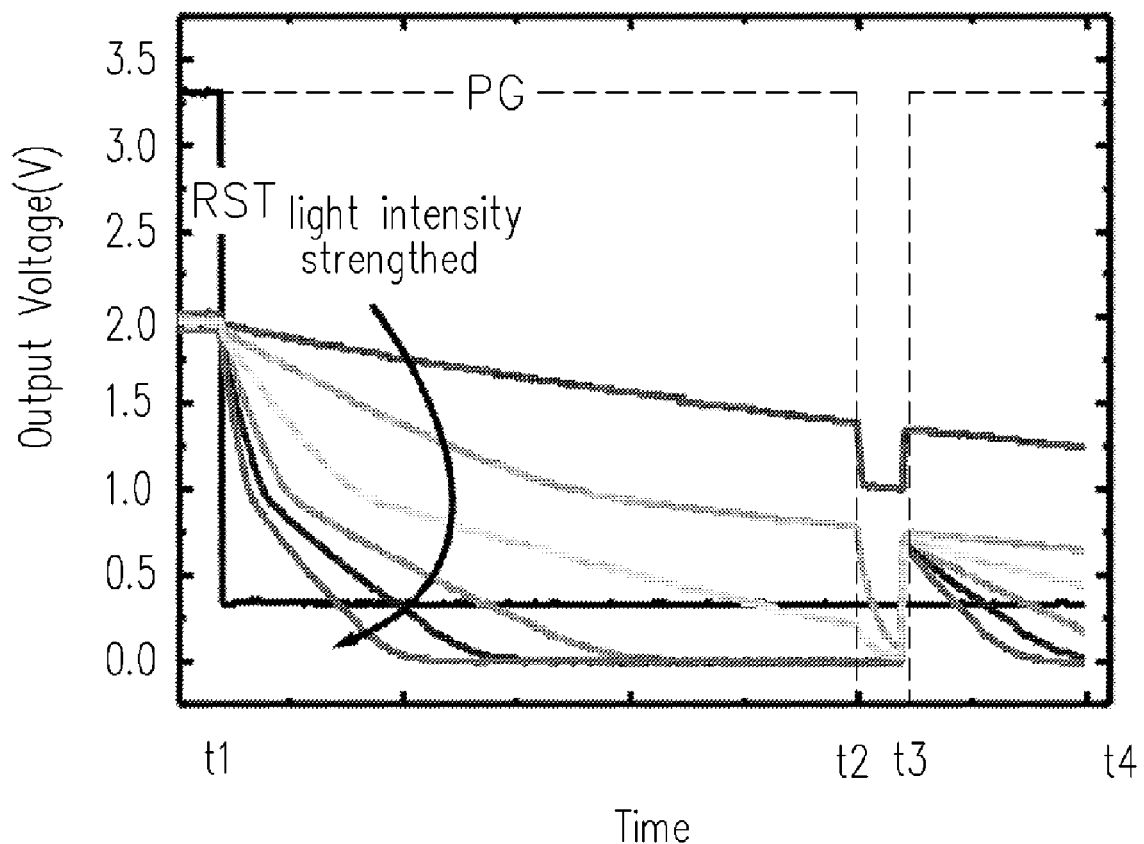
FIG. 5 is an illustration of the relationship of output voltage versus time under different light intensities according to one embodiment of the present invention.

FIG. 5 is an illustration of the relationship of output voltage versus time under different light intensities according to one embodiment of the present invention. Please refer to FIG. 3 and FIG. 5. The control circuit 220 turns off the voltage of the photogate PG at the second time t2 and resumes the voltage at the third time t3. It can be found that when the light intensity is stronger, the decreasing rate of the output voltage is faster. Furthermore, the output voltage rises after the third time t3 and the reason for this will be discussed in detail below.

Figure 6:
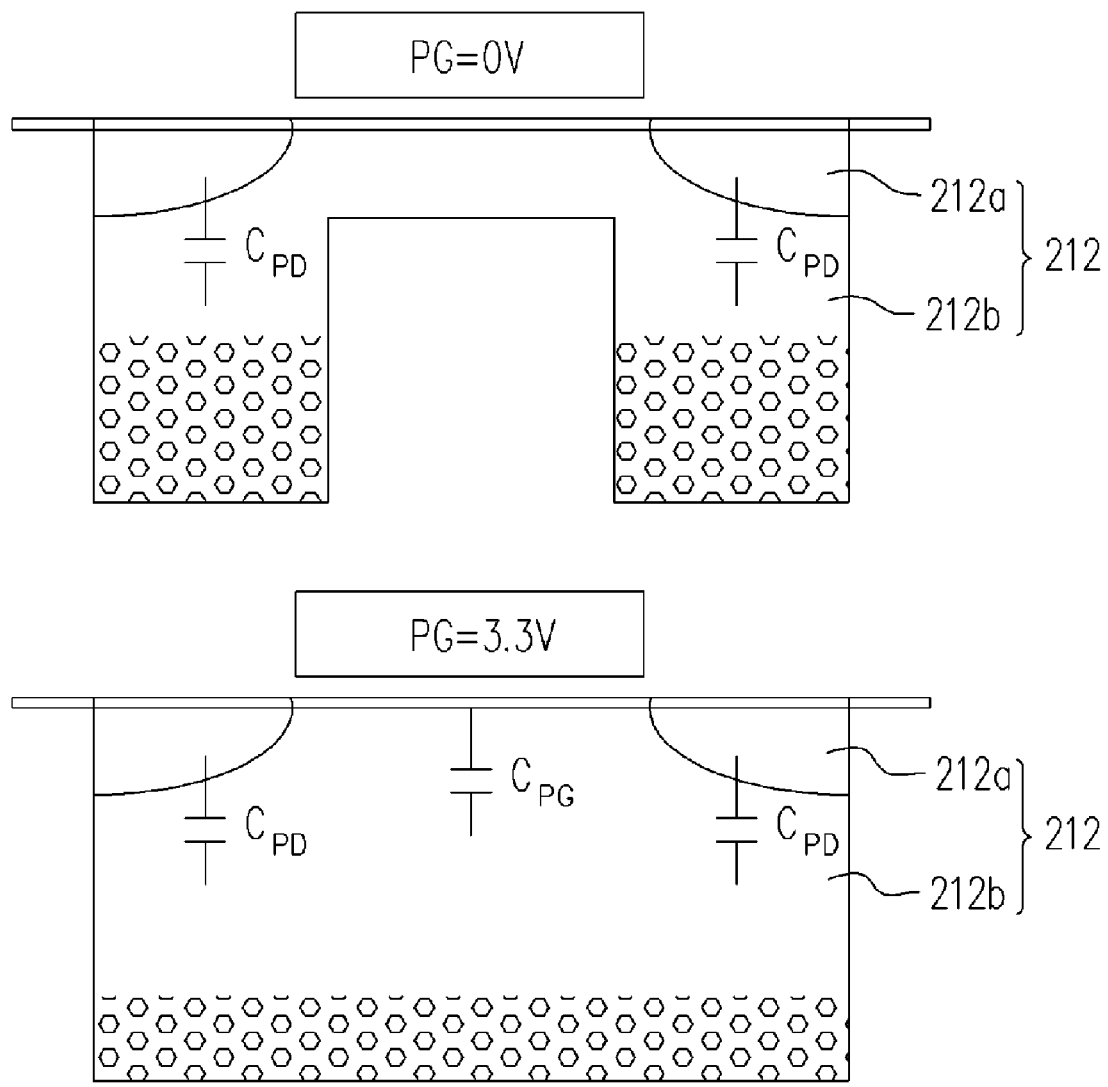
FIG. 6 schematically shows a potential-energy well of the photodiode.

FIG. 6 schematically shows a potential-energy well of the photodiode. Please refer to FIG. 6. A capacity CPD is between N-type doping area 212a and P-type well 212b while the voltage isn't applied on the photogate. When the voltage is applied on the photogate, one inversion layer is generated in the P-type well 212b in a position corresponding to the photogate. Accordingly, except for the capacity CPD, a capacity CPG is also stored. Due to the CPD and CPG, P-type well 212b will produce potential-energy wells where a portion of electrons induced by the illumination of outer light is stored.

Please refer to FIG. 5 and FIG. 6. When the light intensity is stronger, the decreasing rate of the output voltage is faster. The reason for this is that the stronger the light intensity is, the higher the producing rate of the electrons is. Accordingly, the voltage of the N-type doping area 212a decreases, which causes the output voltage to drop. When the voltage applied on photogate is turned off at the second time t2, capacity CPD plus CPG will drop to capacity CPD, and the electrons below capacity CPG will flow to the area underneath capacity CPD. If the maximum electrons stored under capacity CPD+CPG exceed the maximum electrons stored under capacity CPD, the redundant electrons will be expelled via ground terminal. When the voltage is applied on the photogate at the third time t3, the output voltage increases, as the voltage of N-type doping area rises in response to the voltage applied to the photogate, and the amount of electrons is fewer than that before the photogate voltage is turned off at the second time t2.

Figure 7:
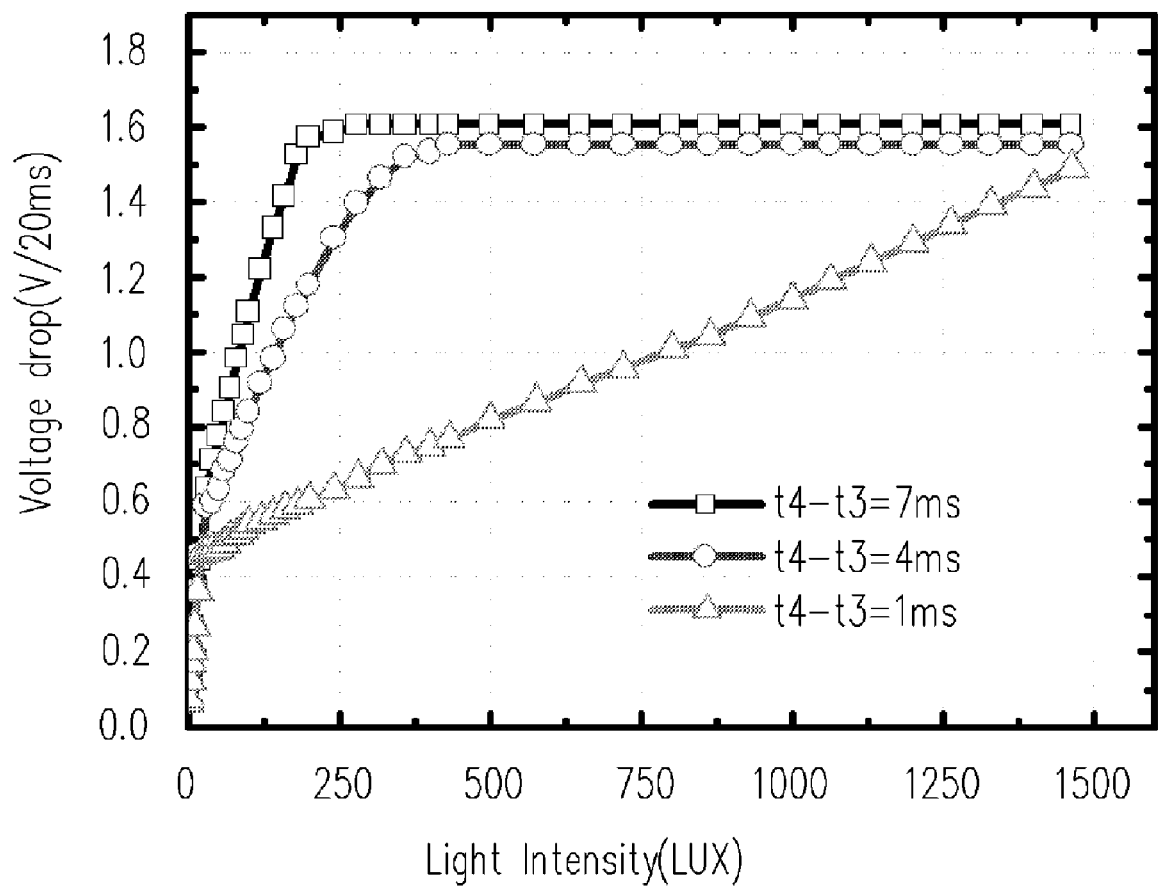
FIG. 7 schematically illustrates how the dynamic range of the image sensor is modulated by changing the difference between the third time and the fourth time.

FIG. 7 schematically illustrates how the dynamic range of the image sensor is modulated by changing the difference between the third time and the fourth time. Please refer to FIG. 6 and FIG. 7. Judged from experimental results, it can be found that the dynamic range would decrease when the difference between t3 and t4 increases. It is because that with bigger difference between t3 and t4, the longer illumination time causes the output voltage at the fourth time t4 to decrease.

Figure 8:
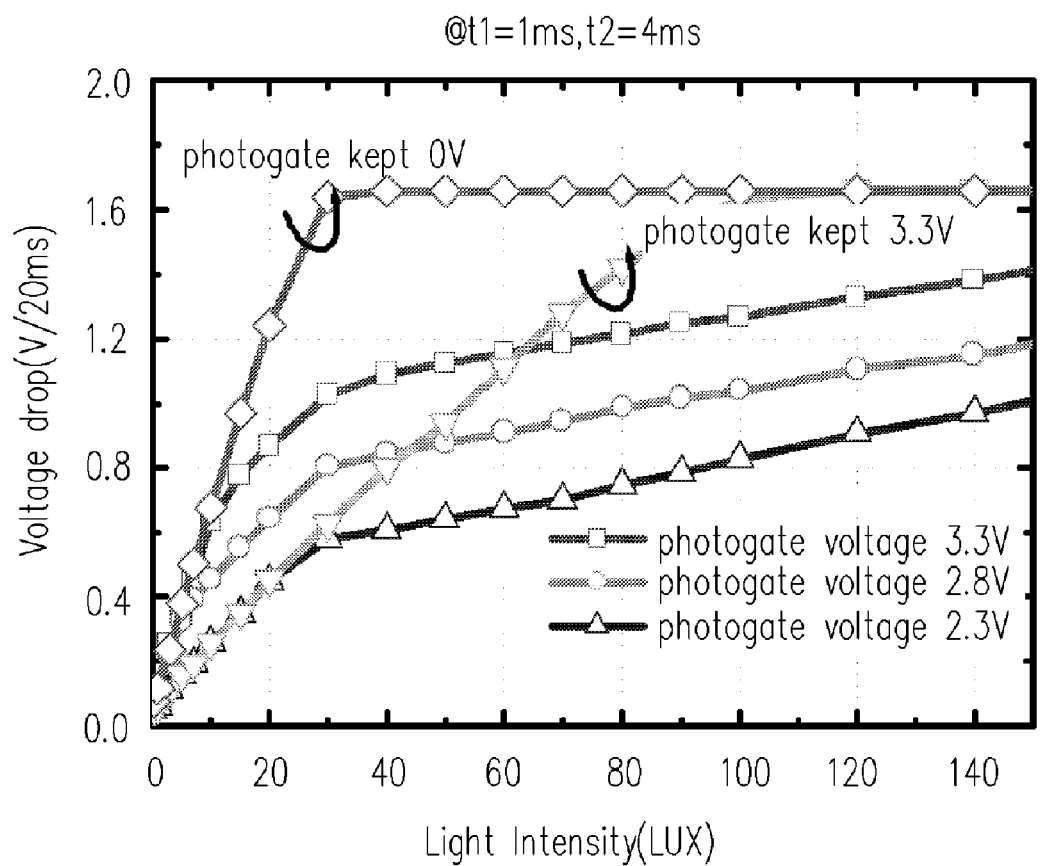
FIG. 8 schematically illustrates how the dynamic range of the image sensor is modulated by changing the voltage applied on the photogate.

FIG. 8 schematically illustrates how the dynamic range of the image sensor is modulated by changing the voltage applied on the photogate. Please refer to FIG. 5 and FIG. 8. The experimental results show that the dynamic range of the image sensor is bigger while the voltage applied on the photogate increases with a bigger margin. That is because the output voltage value at the first time t1 increases with the voltage of the photogate. Further, the rising-back output voltage value at the third time t3 also rises.

It should be noted that the photodiode of image sensor in the present invention is not limited to a metal-oxide-semiconductor, and other diodes with photogate still fall within the scope of the present invention. Furthermore, in the embodiment above, the second voltage V2 usually equals the first voltage V1, but the first voltage V1 and the second voltage V2 could be both equal to the reference voltage Vcc or both not equal to it. In addition, the control circuit may apply the 3rd voltage to the photogate at the second time, and not necessarily turn off the voltage. As long as the third voltage is smaller than the first voltage and the second voltage, the image sensor is able to achieve the desired effect.

To sum up, in the image-sensing device according to the present invention, the control circuit stops applying the first voltage to the photogate at a second time or reduces the photogate voltage lower than the first voltage, and then applies a second voltage on the photogate at a third time to make the photogate voltage rise up to the second voltage. The steps above enable the output voltage to increase, thereby increasing the dynamic range of the image-sensing unit. Besides, the dynamic range of the image sensor can also increase by altering the difference between the fourth time and the third time. The same results can be achieved by modulating the photogate voltage.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An operating method for an image-sensing unit, the image-sensing unit comprising a photogate, a photodiode assembled with the photogate, a source follower, a first switch, and a second switch, a first terminal of the first switch being coupled to a reference voltage, and a second terminal of the first switch being coupled to the photodiode permanently, a first terminal of the source follower is coupled to the reference voltage, a control terminal of the source follower is permanently coupled to another terminal of the photodiode, a first terminal of the second switch is permanently coupled to a second terminal of the source follower, a second terminal of the second switch outputs an output voltage, the first terminal of the first switch is coupled to the first terminal of the source follower, a control circuit is coupled to the image-sensing unit, and directly applies different voltage values at different times to the first switch, the photodiode, and the second switch, respectively, and the operating method comprising:
applying a first voltage to the photogate;
turning on the first switch;
turning off the first switch at a first time;
reducing the first voltage at a second time;
increasing the first voltage at a third time; and
maintaining a turn-off state of the first switch until a fourth time, wherein a voltage applied on a control terminal of the first switch at the fourth time is high.

2. The operating method according to claim 1, further comprising stopping applying the first voltage to the photogate at the second time.

3. The operating method according to claim 2, wherein increasing the first voltage at the third time further comprises modulating the first voltage from a first voltage value to a second voltage value.

4. The operating method according to claim 3, wherein the second voltage value is equal to the first voltage value.

5. The operating method according to claim 3, wherein the first voltage value is equal to a voltage value of the reference voltage.

6. The operating method according to claim 3, wherein the first voltage value is not equal to a voltage value of the reference voltage.

7. The operating method according to claim 3, wherein the second voltage value is equal to a voltage value of the reference voltage.

8. The operating method according to claim 3, wherein the second voltage value is not equal to a voltage value of the reference voltage.

9. The operating method according to claim 1, wherein the first voltage is modulated from a first voltage value to a second voltage value, which is smaller than the first voltage value, at the second time.

10. The operating method according to claim 9, wherein the first voltage is modulated from the second voltage value to a third voltage value, which is larger than the second voltage value, at the third time.

11. The operating method for an image-sensing unit according to claim 1, further comprising modulating the fourth time to change a dynamic range of the image-sensing unit.

12. The operating method according to claim 11, wherein the dynamic range is reduced by increasing the interval between the fourth time and the third time.

13. The operating method for an image-sensing unit according to claim 9, further comprising modulating the first voltage value to change a maximum light detection of the image-sensing unit.

14. The operating method according to claim 13, wherein the maximum light detection is enhanced by increasing the first voltage value.

15. An image-sensing device, comprising:
an image-sensing unit comprising:
a photogate;
a photodiode assembled with the photogate;
a first switch, a first terminal thereof coupled to a reference voltage, and a second terminal thereof permanently coupled to one terminal of the photodiode;
a source follower, a first terminal thereof coupled to the reference voltage, and the control terminal thereof permanently coupled to another terminal of the photodiode, wherein the first terminal of the first switch is coupled to the first terminal of the source follower; and
a second switch, a first terminal thereof permanently coupled to a second terminal of the source follower, and a second terminal thereof outputs an output voltage; and
a control circuit, coupled to the image-sensing unit, wherein the control circuit directly applies different voltage values at different times to the first switch, the photodiode, and the second switch, respectively;
wherein the control circuit modulates voltage values on the first switch, the photodiode, and the second switch, respectively, according to the following steps:
applying a first voltage to the photogate and turning on the first switch;

turning off the first switch at a first time and the photodiode being irradiated by a light;

stopping applying the first voltage to the photogate at a second time;

applying a second voltage to the photogate at a third time;

maintaining a turn-off state of the first switch until a fourth time, wherein a voltage applied on the control terminal of the first switch at the fourth time is high; and turning on the second switch to output the output voltage.

16. The device according to claim 15, wherein the control circuit makes the first voltage equal to the second voltage.

17. The device according to claim 15, wherein the control circuit at least modulates one of the following: the fourth time, an interval between the fourth time and the third time, a voltage value of the first voltage, and a voltage value of the second voltage.

18. The device according to claim 15, wherein the first switch is a transistor, the source follower is a transistor, and the second switch is a transistor.

* * * * *